US010240442B2

(12) United States Patent
Reyes et al.

(10) Patent No.: US 10,240,442 B2
(45) Date of Patent: Mar. 26, 2019

(54) METHODS AND SYSTEMS FOR STIMULATING A SUBTERRANEAN FORMATION CONTAINING A CARBONATE MINERAL

(71) Applicant: Halliburton Energy Services, Inc., Houston, TX (US)

(72) Inventors: Enrique A. Reyes, Tomball, TX (US); Aaron M. Beuterbaugh, Spring, TX (US); Alyssa Lynn LaBlanc, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/679,498

(22) Filed: Apr. 6, 2015

(65) Prior Publication Data

US 2015/0211345 A1 Jul. 30, 2015

Related U.S. Application Data

(63) Continuation-in-part of application No. 13/925,888, filed on Jun. 25, 2013, now Pat. No. 10,072,205.

(51) Int. Cl.
*E21B 43/25* (2006.01)
*C09K 8/035* (2006.01)
(Continued)

(52) U.S. Cl.
CPC .............. *E21B 43/25* (2013.01); *C09K 8/035* (2013.01); *C09K 8/72* (2013.01); *C09K 8/74* (2013.01); *C09K 8/86* (2013.01); *E21B 43/283* (2013.01)

(58) Field of Classification Search
CPC ....................................................... E21B 43/25
See application file for complete search history.

(56) References Cited

U.S. PATENT DOCUMENTS

2008/0139412 A1 6/2008 Fuller
2009/0042748 A1 2/2009 Fuller
(Continued)

FOREIGN PATENT DOCUMENTS

WO WO-2012/171858 A1 12/2012
WO WO-2014/209649 A1 12/2014

OTHER PUBLICATIONS

Rahman et al., Hydroxyiminodisuccinic Acid (HIDS): A Novel Biodegradable Chelating Ligand for the Increase of Iron Bioavailability and Arsenic Phytoextraction, Chemosphere 77 (2009) 207-213.

(Continued)

*Primary Examiner* — William D Hutton, Jr.
*Assistant Examiner* — Charles R Nold
(74) *Attorney, Agent, or Firm* — Thomas Rooney; C. Tumey Law Group PLLC

(57) ABSTRACT

Chelating agents may be used to mitigate the presence of metal ions in a subterranean formation, thereby decreasing the likelihood of the metal ions forming damaging insoluble compounds within the subterranean formation. Methods for treating a subterranean formation can comprise: providing a treatment fluid comprising an aqueous carrier fluid and a chelating agent comprising hydroxyiminodisuccinic acid or any salt thereof; introducing the treatment fluid into a subterranean formation comprising a carbonate mineral; and complexing a metal ion in the subterranean formation with the chelating agent.

12 Claims, 2 Drawing Sheets

(51) Int. Cl.
 C09K 8/72 (2006.01)
 C09K 8/86 (2006.01)
 C09K 8/74 (2006.01)
 E21B 43/28 (2006.01)

(56) References Cited

U.S. PATENT DOCUMENTS

| | | |
|---|---|---|
| 2010/0276152 A1 | 11/2010 | De Wolf et al. |
| 2012/0067576 A1 | 3/2012 | Reyes et al. |
| 2012/0097392 A1 | 4/2012 | Reyes et al. |
| 2012/0115759 A1* | 5/2012 | Reyes ............... C09K 8/524 507/241 |
| 2014/0342953 A1 | 11/2014 | Reyes et al. |
| 2014/0374107 A1 | 12/2014 | Reyes et al. |

OTHER PUBLICATIONS

Hyvonen et al., Complexation of 3-hydroxy-2,2'-iminodisuccinic Acid (HIDS) with $Mg^{2+}$, $Ca^{2+}$, $Mn^{2+}$, $Fe^{3+}$, $Fe^{2+}$, $Co^{2+}$, $Ni^{2+}$, $Cu^{2+}$, and $Zn^{2+}$ Ions in Aqueous Solution, Journal of Coordination Chemistry, 63: 12, 2013-2025, 2010, Mar. 16, 2016.

Pinto et al., Biodegradable Chelating Agents for Industrial, Domestic, and Agricultural Applications—a Review, Environ Sci Pollut Res (2014) 21:11893-11906.

Mahmoud, et al., An Effective Stimulation Fluid for Deep Carbonate Reservoirs: A Core Flood Study, Society of Petroleum Engineers, CPS/SPE International Oil & Gas Conference and Exhibition in China, 2010, SPE 131626.

Mahmoud et al., Stimulation of Carbonate Reservoirs Using GLDA (Chelating Agent) Solutions, Society of Petroleum Engineers, 2010 SPE Trinidad and Tobago Energy/Resources Conference held in Port of Spain, Trinidad, 2010, SPE 132286.

De Wolf et al., Evaluation of Environmentally Friendly Chelating Agents for Applications in the Oil and Gas Industry, Society of Petroleum Engineers, SPE International Symposium and Exhibition on Formation Damage Control held in Lafayette, LA, Feb. 2014, SPE 168145.

\* cited by examiner

METHODS AND SYSTEMS FOR STIMULATING A SUBTERRANEAN FORMATION CONTAINING A CARBONATE MINERAL

CROSS-REFERENCE TO RELATED APPLICATIONS

The present application is a continuation-in-part of U.S. patent application Ser. No. 13/925,888, filed on Jun. 25, 2013, which is incorporated herein by reference in its entirety.

BACKGROUND

The present disclosure generally relates to stimulation of subterranean formations, and, more specifically, to methods and systems for stimulation of subterranean formations in the presence of a metal ion.

Treatment fluids can be used in a variety of subterranean treatment operations. Such treatment operations can include, without limitation, drilling operations, stimulation operations, production operations, remediation operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include drilling operations, fracturing operations, gravel packing operations, acidizing operations, scale dissolution and removal operations, sand control operations, consolidation operations, and the like.

Acidizing operations may be used to stimulate a subterranean formation to increase production of a hydrocarbon resource therefrom. Introduction of the acidizing fluid to the subterranean formation may take place at matrix flow rates without fracturing of the formation matrix, or at higher injection rates and pressures to fracture the formation (i.e., an acid-fracturing operation). During an acidizing operation, an acid-soluble material in the subterranean formation can be dissolved by one or more acids to expand existing flow pathways in the subterranean formation, to create new flow pathways in the subterranean formation, and/or to remove acid-soluble precipitation damage (i.e., scale) in the subterranean formation. The acid-soluble material being dissolved by the acid(s) can be part of or formed from the native formation matrix or can have been deliberately introduced into the subterranean formation in conjunction with a stimulation operation or like treatment operation (e.g., proppant or gravel particulates). Illustrative substances within the native formation matrix that may be dissolved by an acid include, but are not limited to, carbonates, silicates and aluminosilicates.

Carbonate formations can contain minerals that comprise a carbonate anion and a metal counter ion (e.g., calcite (calcium carbonate) and dolomite (calcium magnesium carbonate)). When acidizing a carbonate formation, the acidity of the treatment fluid alone can be sufficient to solubilize the carbonate mineral by decomposing the carbonate anion to carbon dioxide and leeching a metal ion into the treatment fluid. As the concentration of dissolved metal ions rises, particularly at higher pH values upon spending of the acid, the solubility limit may be exceeded and precipitation of scale may occur. Both mineral acids (e.g., hydrochloric acid) and organic acids (e.g., acetic and formic acids) can be used to treat a carbonate formation, often with similar degrees of success.

Siliceous formations can include minerals such as, for example, zeolites, clays, and feldspars. As used herein, the term "siliceous" refers to a substance having the characteristics of silica, including silicates and/or aluminosilicates. Dissolution of siliceous materials through an acidizing operation is thought to be considerably different than acidizing carbonate materials, since the mineral and organic acids that can be effective for acidizing carbonate materials may have little effect on a siliceous materials. In contrast, hydrofluoric acid, another mineral acid, can react very readily with siliceous materials to promote their dissolution. Oftentimes, a mineral acid or an organic acid can be used in conjunction with hydrofluoric acid to maintain a low pH state as the hydrofluoric acid becomes spent during dissolution of a siliceous material. In addition to siliceous materials, many types of siliceous formations can also contain varying amounts of carbonate materials. Most sandstone formations, for example, contain about 40% to about 98% sand quartz particles (i.e., silica), bonded together by various amounts of cementing materials, which may be siliceous in nature (e.g., aluminosilicates or other silicates) or non-siliceous in nature (e.g., carbonates, such as calcite). Reprecipitation of scale can also occur when acidizing a siliceous formation due to secondary reactions of dissolved silicon species.

Calcium ions and other alkaline earth metal ions can be particularly problematic when acidizing both siliceous and non-siliceous subterranean formations. For either type of subterranean formation, the solubility limit of dissolved metal ions can be quickly exceeded and deposition of scale may occur. In the case of siliceous formations being acidized with hydrofluoric acid, dissolved calcium ions can react readily with free fluoride ions to generate highly insoluble calcium fluoride scale. Other metal ions may be similarly problematic in this regard. Calcium fluoride and other types of scale formed from metal ions can be highly damaging to subterranean formations, possibly even more so than if the initial acidizing operation had not been performed in the first place.

One approach that has been used to address the issues associated with dissolved metal ions is to employ chelating agents, which can sequester the metal ions in a more soluble and less reactive form of a metal-ligand complex. As used herein, the terms "complex," "complexing," "complexation" and other variants thereof refer to the formation of a metal-ligand bond without reference to the mode of bonding. Although complexation of a metal ion may involve a chelation process, complexation is not deemed to be limited in this manner. Once bound in a metal-ligand complex, a metal ion may be more soluble and have a significantly decreased propensity to undergo a further reaction to form damaging scale.

There are difficulties associated with chelation strategies, however. At low pH values, the carboxylic acid groups of many chelating agents may be substantially protonated, a form that can be ineffective for promoting metal ion complexation. This issue can significantly limit the working pH range over which an acidizing operation may take place, potentially limiting the acidizing operation's speed and effectiveness. Environmental concerns may also be problematic for some chelating agents. Although a wide variety of chelating agents are known, there may be a very limited number with a favorable environmental profile and availability in sufficient quantities to effectively support various types of subterranean treatment operations. The commercially available alkali metal form of many common chelating agents can also be problematic for acidizing operations when the alkali metal content becomes too high.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

Figure 1:
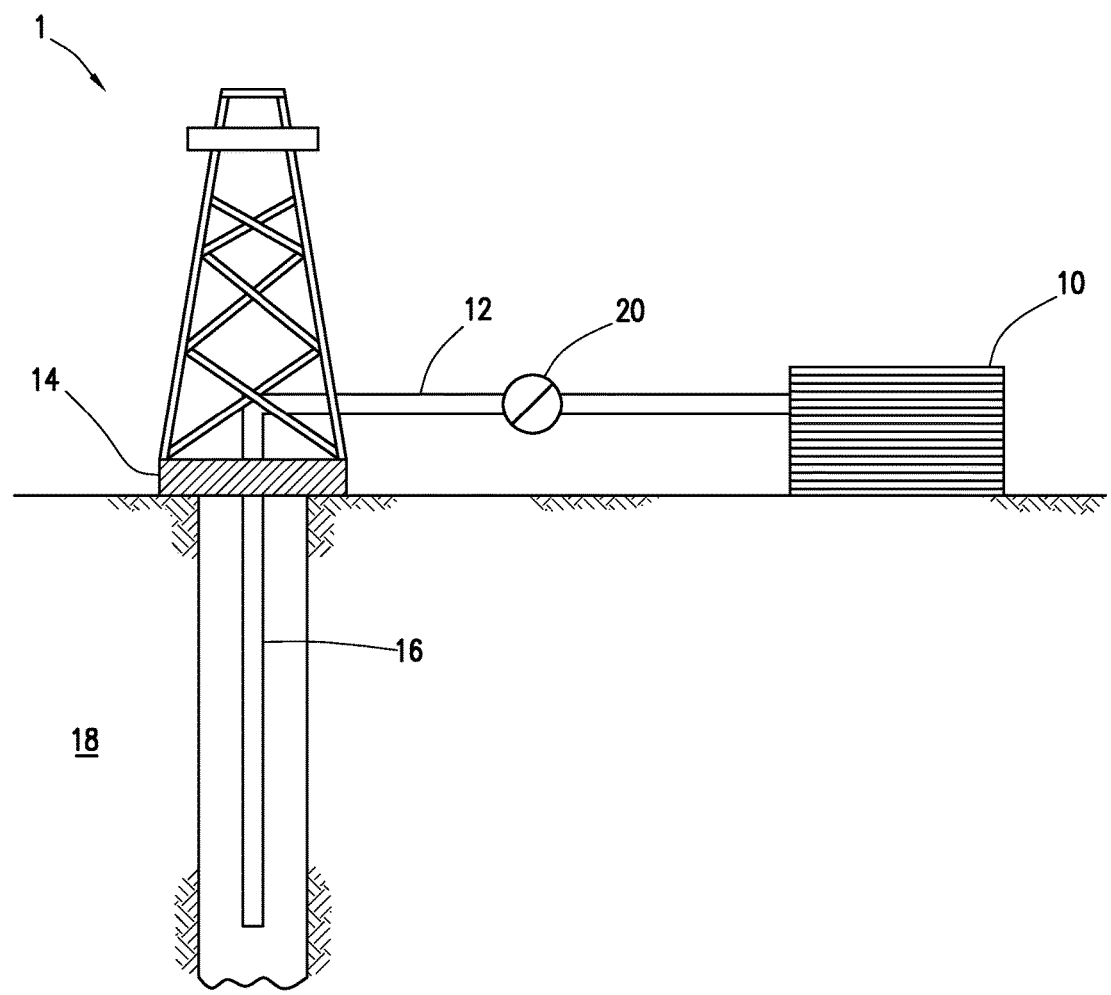
FIG. 1 shows an illustrative schematic of a system that can deliver treatment fluids of the present disclosure to a downhole location.

The present disclosure generally relates to stimulation of subterranean formations, and, more specifically, to methods and systems for stimulation of subterranean formations in the presence of a metal ion.

One or more illustrative embodiments incorporating the features of the present disclosure are presented herein. Not all features of a physical implementation are necessarily described or shown in this application for the sake of clarity. It is to be understood that in the development of a physical implementation incorporating the embodiments of the present disclosure, numerous implementation-specific decisions may be made to achieve the developer's goals, such as compliance with system-related, business-related, government-related and other constraints, which may vary by implementation and from time to time. While a developer's efforts might be time-consuming, such efforts would be, nevertheless, a routine undertaking for one having ordinary skill in the art and the benefit of this disclosure.

As discussed above, chelating agents may be utilized in acidizing operations or in other various subterranean treatment operations to complex a metal ion and sequester it in the subterranean environment. When a metal ion is complexed by a suitable chelating agent, the metal ion may display a decreased propensity for forming a damaging precipitate within a subterranean formation. Complexation of a metal ion, such as a calcium ion or another alkaline earth metal ion, with a chelating agent may change the chemical form of the metal ion such that it does not readily undergo a reaction to form a precipitate and/or as the free metal ion's solubility limit is surpassed. Although precipitation of calcium fluoride or other insoluble metal salts can be a particular concern when acidizing a siliceous formation with hydrofluoric acid, especially a siliceous formation that also contains a carbonate mineral, the generation of calcium-containing precipitates can also be problematic when acidizing carbonate formations as well. In this regard, generation of scale in the form of calcium-containing precipitates may become more prevalent as the acid in an acidizing fluid becomes spent and its pH rises.

Although a multitude of chelating agents have been developed for a variety of general and specific applications, there remains a very limited subset of these compounds that have both a favorable environmental profile and low-cost availability in bulk quantities that can support subterranean treatment operations. The present inventors discovered that hydroxyiminodisuccinic acid (HIDS) or a salt thereof can be a very effective and advantageous chelating agent when used in conjunction with stimulating a subterranean formation containing a carbonate mineral. The structure of HIDS is shown in Formula 1 below.

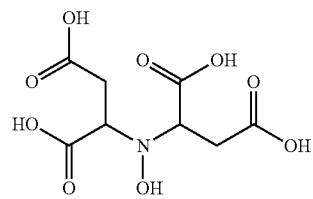

Formula 1

For purposes of this disclosure, all diastereomeric forms of HIDS are encompassed by the structure shown in Formula 1 above, in which the enantiomeric configuration of the two chiral centers is left unspecified.

HIDS can provide a number of advantages when used in conjunction with acidizing a carbonate mineral. HIDS has a high capacity for complexing metal ions and is biodegradable. As used herein, the term "biodegradable" refers to a substance that can be broken down by exposure to environmental conditions including native or non-native microbes, sunlight, air, heat, and the like. Use of the term "biodegradable" does not imply a particular degree of biodegradability, mechanism of biodegradability, or a specified biodegradation half-life. Furthermore, HIDS is commercially available in metric ton quantities at a relatively low cost as an aqueous concentrate of its tetrasodium salt. Since alkali metal ions are usually not especially problematic when acidizing a carbonate mineral, at least at low concentrations, this salt form of HIDS may serve as a direct replacement for other less desirable chelating agents in an acidizing fluid used for carbonate acidizing operations, and existing oilfield infrastructure may be used for formulating the acidizing fluid. Moreover, when the chelating agent is in its tetrasodium salt form, the carboxylic acid groups are deprotonated and in a state when they can directly complex a metal ion without further pH adjustment. However, further pH adjustment may take place, if needed, should the rate of acidizing need to be increased or decreased for a particular situation or if a particular pH range is needed to promote complexation of a particular metal ion of interest. Acidification and ion exchange, selective precipitation, or like techniques may also be used to affect at least partial removal of the sodium ions, if needed. As a further advantage, the tetrasodium salt of HIDS may obviate the need for use of clay control additives to prevent lithological incompatibilities when acidizing a carbonate mineral.

One of ordinary skill in the art will recognize that there are fairly well established pH ranges over which a chelating agent can be expected to effectively complex a metal ion. The pH range over which metal ion complexation may effectively take place can be dependent on a number of factors including, but not limited to, the chemical structure of the chelating agent, the functional groups present in the chelating agent, and the particular metal ion being complexed. Nevertheless, one of ordinary skill in the art will understand these issues and be able to determine if a particular metal ion is being effectively complexed by a given chelating agent under specific pH conditions. For example, as indicated above, in a chelating agent containing carboxylic acid groups, complexation of a metal ion may occur when one or more of the carboxylic acid groups are in a deprotonated state. In contrast, when the carboxylic acid groups are substantially protonated (e.g., when the chelating agent is present in a treatment fluid with a pH below the $pK_a$ values of the carboxylic acid groups), there may not be an available electron pair on the chelating agent to form a metal-ligand bond with a metal ion. Accordingly, when chelating agents have typically been used in treatment fluids, the pH values of the treatment fluids have usually been chosen to be in a range that is effective for metal ion complexation to take place. Ordinarily, there is no motivation to work outside this effective pH range.

In relation to the effective working pH, HIDS has a first $pK_a$ value of 2.83. Accordingly, this chelating agent can remain at least partially deprotonated at or above a corresponding pH value such that it is effective to promote metal ion complexation. At such pH values, an acidizing fluid containing HIDS can still maintain sufficient acidity to promote a satisfactory rate of carbonate mineral dissolution. Since the pH need not be excessively low when using HIDS, this chelating agent advantageously may not promote excessive corrosion and can provide good environmental and safety factors. Moreover, the effective working pH of HIDS may contribute to improved environmental and safety factors during production of the spent acidizing fluid.

Although it is usually desirable to operate in a pH range where HIDS or another chelating agent is active for complexing a metal ion, the present inventors also discovered that working outside the pH range where complexation normally takes place may also be advantageous in other respects. Specifically, the present inventors discovered that chelating agents may be able to deliver surprising benefits during acidizing operations, even when employed at pH values that are below those at which the chelating agents are normally effective for complexing a metal ion. More specifically, the inventors discovered that by employing aminopolycarboxylic acid chelating agents in acidizing or like stimulation operations at pH values below those at which metal ion complexation usually takes place, the rate of carbonate dissolution may desirably be decreased. In addition to lowering the rate of carbonate dissolution at low pH, many aminopolycarboxylic acid chelating agents are also biodegradable and can provide similar benefits to HIDS in this regard.

Although it can sometimes be desirable to increase the rate of carbonate dissolution in an acidizing or like stimulation operation, when an acidizing operation's goal is to generate wormholes, a decreased rate of carbonate dissolution may be more desirable when warranted by downhole conditions. In the present case, the decreased rate of carbonate dissolution at more acidic pH values in the presence of aminopolycarboxylic acid chelating agents was completely unexpected, as increased acidity would normally be expected to produce a faster dissolution rate due to action of the acid. When the pH of an aminopolycarboxylic acid chelating agent is below the effective complexation pH range, dissolution of a carbonate mineral is typically promoted only by the action of the acid. In contrast, when working within the effective pH range, both acid-promoted dissolution and ligand-promoted dissolution of the carbonate mineral may take place.

Once the chelating agent has slowed the initial rate of acidizing, the chelating agent may remain present in the subterranean formation undergoing treatment. As the acidizing operation progresses and the acidizing fluid becomes spent, the pH can rise. At this stage, an initially inactive chelating agent can once again become operable for complexing a metal ion. For example, the chelating agent can complex a metal ion liberated from a carbonate mineral (e.g., a calcium ion) through an initial acid-promoted dissolution. In contrast to typical procedures in which a chelating agent is employed, where acid-promoted dissolution and ligand-promoted dissolution are operating substantially simultaneously or in concert, the complexation effect onset is believed to be delayed when utilizing the chelating agent below its effective complexation pH. Hence, when used below their effective complexation pH, chelating agents may play a dual role of slowing dissolution rates and performing a delayed metal complexation reaction as the treatment fluid's pH increases upon spending. These dual roles are significantly different than those played by these compounds in typical acidizing operations. Although the metal ion complexation response is delayed when the chelating agent is used in this manner, complexation begins to take effect in most cases within a pH realm where metal ion sequestration is more often needed, rather than in a low pH range where the solubility can remain higher.

In addition to the advantages described above, utilization of chelating agents in the manner described above can have further benefits during an acidizing or like stimulation operation. One benefit is that the number of treatment stages conducted during an acidizing operation may be decreased by using a single, low pH treatment fluid comprising a chelating agent or a salt thereof. Moreover, although the advantages described above may be particularly beneficial when used in conjunction with acidizing a carbonate formation, related benefits may also be realized when removing a carbonate material from a predominantly siliceous formation. In this regard, the treatment fluids described herein may be used to dissolve a carbonate material in a siliceous formation during a first acidizing stage, such that calcium ions are removed from the formation before acidizing of a siliceous material takes place with hydrofluoric acid in a second acidizing stage, thereby decreasing the risk of calcium fluoride precipitation.

As an additional benefit of HIDS and other aminopolycarboxylic acid chelating agents, these compounds generally possess good solubilities in aqueous fluids, even when their carboxylic acid groups are substantially protonated. Many other types of chelating agents, in contrast, often display limited solubilities at low pH values, particularly at pH values where their carboxylic acid groups are substantially protonated. Working within a soluble pH range is not usually an operational hindrance with most chelating agents in conventional acidizing operations, since this pH range oftentimes overlaps with the pH range over which the chelating agents are most effective for complexing a metal ion. However, it is believed that the limited solubilities of many conventional chelating agents may be problematic for some types of chelating agents when working below the pH range over which the chelating agent is most effective for complexing a metal ion. Hence, HIDS and other aminopolycarboxylic acid chelating agents can be further advantageous in this regard as well.

In some embodiments, the treatment fluids and methods described herein can be utilized in matrix acidizing operations. That is, in some embodiments, the treatment fluids described herein can be introduced to a subterranean formation below a fracture gradient pressure of the subterranean formation. In such embodiments, the interaction of the treatment fluid with the formation matrix may result in the desirable formation of wormholes therein. In other embodiments, the treatment fluids described herein can be introduced to a subterranean formation at or above a fracture gradient pressure of the subterranean formation, such that one or more fractures are created or enhanced in the subterranean formation. Given the benefit of the present disclosure and the understanding of one having ordinary skill in the art, one can readily determine whether to introduce the treatment fluids to a subterranean formation at matrix flow rates (i.e., below the fracture gradient pressure) or at fracturing flow rates (i.e., at or above the fracture gradient pressure).

In some embodiments, methods described herein can comprise: providing a treatment fluid comprising an aqueous carrier fluid and a chelating agent comprising hydroxyiminodisuccinic acid or any salt thereof; introducing the treatment fluid into a subterranean formation comprising a carbonate mineral; and complexing a metal ion in the subterranean formation with the chelating agent. In further embodiments, the methods may comprise dissolving at least a portion of the carbonate mineral with the treatment fluid, as discussed below.

In some embodiments, the treatment fluid may have a pH that is initially at or above a $pK_a$ value for one or more of the carboxylic acid groups in the chelating agent. That is, in some embodiments, the treatment fluid may have a pH at which the chelating agent is initially active for complexing a metal ion. In this regard, the four $pK_a$ values for HIDS are approximately the following: 2.83, 3.56, 5.15 and 9.11. Further discussion is provided below concerning suitable pH ranges for an acidizing fluid comprising HIDS.

In other various embodiments, the treatment fluid may have a pH below that at which the chelating agent is substantially protonated and the chelating agent is initially inactive for complexing the metal ion. That is, in such embodiments, the treatment fluid may have a pH below the $pK_a$ value for the most acidic carboxylic acid in the chelating agent (i.e., 2.83 for HIDS). Accordingly, below a pH value of approximately 2.8, HIDS can be initially inactive for complexing a metal ion. However, as discussed above, the chelating agent may still provide other desirable benefits during an acidizing operation. In such embodiments, the pH of the treatment fluid can rise as the acid reacts and the treatment fluid at least partially spends such that the chelating agent again becomes active for complexing the metal ion at a pH at or above the first $pK_a$ value.

In more specific embodiments, methods of the present disclosure may comprise: providing a treatment fluid comprising an aqueous carrier fluid, an acid, and a chelating agent comprising an aminopolycarboxylic acid, the treatment fluid having a pH below that at which the carboxylic acid groups of the chelating agent are substantially protonated and the chelating agent is ineffective for complexing a metal ion; introducing the treatment fluid into a subterranean formation comprising a carbonate mineral; reacting the acid with the carbonate mineral in the presence of the chelating agent, such that the acid at least partially spends and the pH of the treatment fluid rises; and once the pH of the treatment fluid rises above a $pK_a$ value for one or more of the carboxylic acid groups, complexing a metal ion with the chelating agent. The aminopolycarboxylic acid may comprise HIDS in some embodiments of the present disclosure. In some embodiments, a chelating agent having substantially protonated carboxylic acid groups has no deprotonated carboxylic acid functionalities.

In some embodiments, the treatment fluid may be introduced to the subterranean formation below a fracture gradient of the subterranean formation. At such introduction pressures, the treatment fluid may form wormholes in the carbonate mineral in some embodiments, or result in bulk erosion of the carbonate mineral in other embodiments. In some embodiments, the carbonate mineral may comprise the matrix of a carbonate formation, in which the generation of wormholes may be desirable. The mode of dissolution may depend, at least in part, upon the pH of the treatment fluid, as discussed above. One of ordinary skill in the art will recognize the circumstances under which wormhole generation or bulk surface erosion is more desirable. Accordingly, in some embodiments, reacting the acid with the carbonate mineral in the presence of the chelating agent may comprise interacting the acid with the carbonate mineral in a manner to form one or more wormholes therein.

In other embodiments, the treatment fluid may be introduced to the subterranean formation at a pressure at or above a fracture gradient of the subterranean formation. Although wormhole generation is not as likely in such embodiments, the other features and advantages of the methods described herein may still be realized. However, even in acid-fracturing embodiments, some degree of wormhole generation may be realized in the course of creating or extending a subterranean fracture.

In some embodiments, methods described herein may comprise: providing a treatment fluid comprising an aqueous carrier fluid, an acid, and a chelating agent comprising an aminopolycarboxylic acid, the treatment fluid having a pH at or below that at which the carboxylic acid groups of the chelating agent are substantially protonated and the chelating agent is ineffective for complexing a metal ion; introducing the treatment fluid into a subterranean formation comprising a carbonate mineral, the treatment fluid being introduced into the subterranean formation at a pressure greater than or equal to a fracture gradient of the subterranean formation, so as to form a fractured formation; reacting the acid with the carbonate mineral in the fractured formation such that the acid at least partially spends and the pH of the treatment fluid rises; and once the pH of the treatment fluid rises above a $pK_a$ value for one or more of the carboxylic acid groups, complexing a metal ion with the chelating agent.

In various embodiments, the treatment fluids described herein can comprise an aqueous carrier fluid as their continuous phase. Suitable aqueous carrier fluids may include, for example, fresh water, acidified water, brackish water, produced water, groundwater, salt water, seawater, brine (e.g., a saturated salt solution), or an aqueous salt solution (e.g., a non-saturated salt solution). Aqueous carrier fluids may be obtained from any suitable source. Given the benefit of the present disclosure, one of ordinary skill in the art will be able to determine a suitable aqueous carrier fluid for utilization in the embodiments described herein.

In further embodiments, an organic co-solvent may be present in the treatment fluids. Suitable organic co-solvents may include, but are not limited to, glycols and alcohol solvents, for example. When present, an amount of the organic co-solvent may range between about 1% to about 50% by volume of the treatment fluid.

In some embodiments, the treatment fluids described herein may have a pH that is below the $pK_a$ values of the carboxylic acid groups comprising the chelating agent. That is, the chelating agent may be substantially protonated and inactive for complexing a metal ion at such pH values. Further factors that may be taken into account in determining a suitable pH for a treatment fluid include, for example, the composition of the subterranean formation and the desired acidizing rate. In some embodiments, the treatment fluids described herein can have a pH value of about 3 or lower, or about 2.5 or lower, or about 2 or lower, or about 1.5 or lower, or about 1 or lower. In some embodiments, the pH of the treatment fluids may range between about 3 and about 0, or between about 2.5 and about 0, or between about 2 and about 0, or between about 1.5 and about 0, or between about 1 and about 0.

In other various embodiments, the treatment fluids may have a pH at which the chelating agent is initially active to complex a metal ion. When acidizing a subterranean formation comprising a carbonate mineral using HIDS or a salt thereof, for example, the pH may range between about 2.8 and about 6. In more specific embodiments, the pH may range between about 2.8 and about 4, or between about 3 and about 5, or between about 3 and about 4. At such pH values, the HIDS may be at least partially deprotonated and active to complex a metal ion while the treatment fluid is still sufficiently acidic to promote dissolution of a carbonate mineral. When used within such pH realms, dissolution of a carbonate mineral may be promoted both through acidity and via direct complexation of a metal ion comprising the carbonate mineral. When used to treat calcium sulfate scale, for example, higher pH values may be more effective, such as pH values between about 8 and about 10.

In some embodiments, the treatment fluids described herein may include an acid. When present, the acid may react with a carbonate mineral to liberate a metal ion therefrom. Acid-generating compounds may also be used in the treatment fluids in a substantially equivalent manner. The acid or acid-generating compound may be a mineral acid, an organic acid or any combination thereof. In some embodiments, a suitable acid can be hydrochloric acid, or hydrochloric acid in combination with an organic acid. Hydrobromic acid alone or in combination with an organic acid may also be used. Organic acids may also be used in place of a mineral acid. Suitable organic acids may include, for example, formic acid, acetic acid, chloroacetic acid, dichloroacetic acid, trichloroacetic acid, fluoroacetic acid, difluoroacetic acid, trifluoroacetic acid, methanesulfonic acid, trifluoromethanesulfonic acid, and the like. Examples of suitable acid-generating compounds that may be used in some embodiments described herein include, for example, esters, aliphatic polyesters, orthoesters, poly(orthoesters), poly(lactides), poly(glycolides), poly(ε-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, and formate esters of pentaerythritol.

In other various embodiments, an acid or an acid-generating compound may be introduced to a subterranean formation separately from a treatment fluid comprising HIDS or a salt thereof. In such embodiments, the acid may at least partially dissolve a carbonate mineral to liberate a metal ion therefrom, and the treatment fluid containing HIDS may then be introduced to the subterranean formation to complex the liberated metal ion.

In various embodiments, the treatment fluids described herein may be free or substantially free of hydrofluoric acid or a hydrofluoric acid-generating compound. When treating a subterranean formation to affect dissolution of a carbonate mineral, it can be desirable for the treatment fluid to be free of or substantially free of hydrofluoric acid or a hydrofluoric acid-generating compound. As used herein, a treatment fluid will be considered to be substantially free of hydrofluoric acid or a hydrofluoric acid-generating compound if there is less than about 0.5% hydrofluoric acid or generatable hydrofluoric acid present by weight. In other embodiments, the treatment fluids may be free of hydrofluoric acid or a hydrofluoric acid-generating compound altogether. Hydrofluoric acid-generating compounds may include substances such as, for example, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, polyvinylammonium fluoride, polyvinylpyridinium fluoride, pyridinium fluoride, imidazolium fluoride, ammonium fluoride, tetrafluoroborate salts, hexafluoroantimonate salts, hexafluorophosphate salts, bifluoride salts (e.g., ammonium bifluoride), and various boron trifluoride complexes. As discussed above, hydrofluoric acid may be used to dissolve a siliceous material in a subterranean formation. Although some embodiments of the treatment fluids described herein may be substantially free of hydrofluoric acid or a hydrofluoric acid-generating compound, they may still be used to treat a siliceous formation in some cases. For example, in some embodiments, a substantially hydrofluoric acid-free treatment fluid may be used to remove a carbonate mineral that is present in a siliceous formation. That is, in some embodiments, the subterranean formation into which the treatment fluid is introduced may further comprise a siliceous mineral in addition to a carbonate mineral. Thereafter, at least a portion of the siliceous mineral in the subterranean formation may be removed in a separate acidizing stage with a treatment fluid comprising hydrofluoric acid or a hydrofluoric acid-generating compound. Conducting the acidizing operation in multiple stages can lessen the likelihood of forming scale from dissolved silicon species upon acidizing the siliceous mineral.

A chelating agent may also be present in a treatment fluid that comprises hydrofluoric acid or a hydrofluoric acid-generating compound, such that the treatment fluid is operable for treating a dissolving a siliceous mineral in the presence of metal ions. The metal ions can arise from dissolution of a co-present carbonate mineral or from another source within the subterranean formation. Illustrative siliceous materials that may be removed from a subterranean formation following removal of a carbonate mineral can include silicates and aluminosilicates such as, for example, silica, quartz, sandstone, clays, feldspars, and the like.

In various embodiments, an amount of the acid or acid-generating compound present in the treatment fluid can be sufficient to produce a pH value in the ranges noted above. When the acid comprises a mineral acid such as hydrochloric acid, for example, the acid may be initially present in the treatment fluid in an amount ranging between about 1% to about 10% of the treatment fluid by weight, or in an amount ranging between about 5% to about 10% of the treatment fluid by weight. Since organic acids are generally less acidic than are mineral acids, when the treatment fluid comprises an organic acid, the organic acid may comprise up to about 20% of the treatment fluid by weight, particularly between about 1% to about 20% of the treatment fluid by weight, or between about 10% to about 20% of the treatment fluid by weight.

In more particular embodiments, the treatment fluid may initially contain hydrochloric acid in an amount ranging between about 1% to about 10% of the treatment fluid by weight, or between about 1% to about 5% of the treatment fluid by weight, or between about 5% to about 10% of the treatment fluid by weight. In some or other embodiments, the treatment fluid may initially contain greater than about 1% hydrochloric acid by weight, or greater than about 5% hydrochloric acid by weight.

In various embodiments, the treatment fluids described herein can be introduced to a subterranean formation that comprises a carbonate mineral such as, for example, calcite (calcium carbonate), dolomite (calcium magnesium carbonate), siderite (iron carbonate), or any combination thereof. As alluded to above, in some embodiments, the carbonate mineral may be the predominant component of the subterranean formation (i.e., the subterranean formation may comprise a carbonate formation), or the carbonate mineral may be co-present with other minerals such as, for example, siliceous minerals, including those noted above. Illustrative carbonate formations that may be acidized using the treatment fluids and methods described herein include, for example, limestone and chalk formations. Chalk formations are to be distinguished from other types of carbonate formations due to their high porosity, but generally low permeability values. Specifically, chalk formations can be highly porous, but the pores may lack interconnectivity, such that the chalk formation exhibits low apparent permeability values (e.g., about 10 mD or below) until acidized to form wormholes or like permeability-increasing modifications therein.

The temperature of the subterranean formation into which the treatment fluid is introduced is likewise not believed to be particularly limited. In some embodiments, the subterranean formation may have a temperature of about 100° F. or above, or about 150° F. or above, or about 200° F. or above, or about 250° F. or above, or about 300° F. or above. As will be recognized by one having ordinary skill in the art, as the temperature of the subterranean formation increases, the reaction rate of the acid with a carbonate mineral in the subterranean formation may also increase. One of ordinary skill in the art will further recognize that rapid reaction rates in higher temperature subterranean formations can make it difficult to generate wormholes therein in a reliable manner. However, by using a treatment fluid in accordance with some of the present embodiments, wormholes may be generated in a subterranean formation by introducing the treatment fluid below a fracture gradient pressure of the subterranean formation. That is, in some embodiments, reacting the acid in the treatment fluid with the carbonate mineral may comprise interacting the acid with the carbonate mineral in a manner to form one or more wormholes therein. In alternative embodiments, one or more fractures may be created or extended in the subterranean formation by introducing the treatment fluid to the subterranean formation at a pressure that is at or above the fracture gradient, optionally with some wormhole generation occurring during this process. One of ordinary skill in the art will understand how to measure the fracture gradient of a subterranean formation and how to introduce a treatment fluid to a subterranean formation above or below this pressure.

In various embodiments, the methods described herein may comprise complexing a metal ion with the chelating agent. As discussed above, the chelating agent may be initially active to complex the metal ion or initially inactive. When initially inactive, the chelating agent may become active for promoting metal ion complexation as the treatment fluid spends and its pH rises. The metal ion being complexed by the chelating agent is not believed to be particularly limited. Illustrative sources of the metal ion may include, for example, a native carbonate mineral present in the subterranean formation, a non-native carbonate material that was previously introduced to the subterranean formation, and/or metal ions being leeched into the subterranean formation through corrosion of a drilling tool or wellbore pipe, for example. Illustrative metal ions that may be present in a subterranean formation due to dissolution of a carbonate mineral include, for example, calcium ions, magnesium ions, iron ions and any combination thereof. Illustrative metal ions that may be present in a subterranean formation due to corrosion include iron ions, or any other metal ion resulting from the dissolution of steel by an acid. In various embodiments, the metal ion being complexed by the chelating agent may include, for example, a calcium ion, a magnesium ion, an iron ion, or any combination thereof. The metal ion may be complexed with the chelating agent through a direct reaction of the chelating agent and a surface in the subterranean formation (i.e., a carbonate mineral surface), or the metal ion may be complexed by the chelating agent after the metal ion has undergone an initial dissolution by an acid.

In addition to HIDS, a number of other aminopolycarboxylic acids may also be suitable for use as the chelating agent in the treatment fluids and associated methods described herein. For example, other aminopolycarboxylic acid chelating agents may be used in combination with HIDS to promote metal ion complexation in a pH region where HIDS is ineffective for this purpose. In other embodiments, an aminopolycarboxylic acid chelating agent may be used to control the rate of reaction of an acid with a carbonate mineral, as discussed above, while HIDS promotes metal ion complexation. In the converse, HIDS may also be used to control the reaction rate of an acid with a carbonate mineral while another aminopolycarboxylic acid promotes metal ion complexation. In this regard, suitable aminopolycarboxylic acid chelating agents that may be used in combination with HIDS include, for example, glutamic acid diacetic acid (GLDA), methylglycine diacetic acid (MGDA), β-alanine diacetic acid (β-ADA), ethylenediaminedisuccinic acid, S,S-ethylenediaminedisuccinic acid (EDDS), iminodisuccinic acid (IDS), polyamino disuccinic acids, N-bis[2-(1,2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), N-bis[2-(carboxymethoxy)ethyl]glycine (BCA3), N-bis[2-(methylcarboxymethoxy)ethyl]glycine (MCBA3), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, any salt thereof, any derivative thereof, or any combination thereof. Particularly suitable biodegradable chelating agents that may be used in combination with HIDS in the treatment fluids described herein include, for example, MGDA, GLDA, EDDS, β-ADA, IDS, TCA6, BCA3, BCA5, BCA6, MCBA3, MCBA5, any salt thereof, any derivative thereof or any combination thereof.

In some embodiments, as an alternative to aminopolycarboxylic acid chelating agents, traditional chelating agents such as, for example, ethylenediaminetetraacetic acid (EDTA), propylenediaminetetraacetic acid (PDTA), nitrilotriacetic acid (NTA), N-(2-hydroxyethyl)ethylenediaminetriacetic acid (HEDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediaminedi(o-hydroxyphenylacetic) acid (EDDHA), glucoheptonic acid, gluconic acid, citric acid, any salt thereof, any derivative thereof, or the like may be included in combination with HIDS in the treatment fluids described herein.

In some embodiments, the chelating agent may comprise the neutral form of the chelating agent. In other embodiments, the chelating agent may comprise a salt form of the chelating agent, including an alkali metal salt of the chelating agent. For example, in the case of HIDS, a suitable alkali metal salt form of the chelating agent may comprise the tetrasodium salt form. Other salt forms of the chelating agent may also be used and include, for example, an ammonium salt form or a quaternary ammonium salt form.

In more particular embodiments, methods described herein may comprise: providing a treatment fluid comprising an aqueous carrier fluid and a chelating agent comprising an alkali metal salt of hydroxyiminodisuccinic acid; introducing the treatment fluid into a subterranean formation comprising a matrix of a carbonate mineral; dissolving at least a portion of the carbonate mineral with an acid to produce a metal ion; and complexing the metal ion with the chelating agent.

In some embodiments, dissolving at least a portion of the carbonate mineral may comprise generating wormholes in the carbonate matrix. The generation of wormholes may increase the permeability of the carbonate matrix and stimulate production. In some embodiments, the generation of wormholes may result from directly complexing a metal ion by interacting the chelating agent with the carbonate mineral. In other embodiments, an acid may promote decomposition of a carbonate anion and leech a metal ion into the treatment fluid. Upon release of the metal ion into the treatment fluid, the chelating agent may complex the metal ion to suppress its ability to form damaging precipitates or scale in the subterranean formation. The acid may be present in the treatment fluid comprising the chelating agents or be present in a separate treatment fluid.

In various embodiments, the concentration of the chelating agent in the treatment fluid may range between about 0.1% to about 40% of the treatment fluid by weight. In some embodiments, the concentration of the chelating agent in the treatment fluid may range between about 0.1% to about 5% of the treatment fluid by weight, or between about 1% to about 10% of the treatment fluid by weight, or between about 5% to about 15% of the treatment fluid by weight, or between about 0.5% to about 5% of the treatment fluid by weight, or between about 10% to about 25% of the treatment fluid by weight, or between about 10% to about 40% of the treatment fluid by weight, or between about 30% to about 40% of the treatment fluid by weight.

In additional embodiments, the treatment fluids described herein may further comprise any number of additives that are commonly used in downhole operations including, for example, silica scale control additives, surfactants, gel stabilizers, anti-oxidants, polymer degradation prevention additives, relative permeability modifiers, scale inhibitors, corrosion inhibitors, foaming agents, defoaming agents, antifoaming agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, breakers, friction reducers, bridging agents, viscosifiers, weighting agents, solubilizers, pH control agents (e.g., buffers), hydrate inhibitors, consolidating agents, bactericides, catalysts, clay stabilizers, breakers, delayed release breakers, and the like. Combinations of these additives can be used as well. Given the benefit of the present disclosure, one of ordinary skill in the art will be able to formulate a treatment fluid having properties suitable for a given application.

Accordingly, in various embodiments, treatment fluids comprising HIDS are described herein, optionally in combination with another aminopolycarboxylic acid chelating agent. More specifically, the treatment fluids of the present disclosure may comprise an aqueous carrier fluid, an acid or an acid-generating compound, and a chelating agent comprising hydroxyiminodisuccinic acid or any salt thereof.

In more particular embodiments, the chelating agent may comprise an alkali metal salt of hydroxyiminodisuccinic acid.

In various embodiments, the acid may comprise a mineral acid, an organic acid, an acid-generating compound or any combination thereof. Suitable acids and acid-generating compounds include, but are not limited to, those indicated above. In various embodiments, the treatment fluid may be substantially free of hydrofluoric acid or a hydrofluoric acid-generating compound.

In various embodiments, the acid or acid-generating compound may be included in the treatment fluids in an amount sufficient to condition the chelating agent to be initially active for complexing a metal ion or initially inactive for complexing a metal ion. In some embodiments, the treatment fluids may have a pH that is initially at or above a $pK_a$ value for one or more of the carboxylic acid groups comprising the chelating agent. In the case of HIDS, the treatment fluids may have a pH above about 2.8, particularly a pH of about 3 to about 6, or about 4 to about 5, such that at least the most acidic carboxylic acid group is at least partially deprotonated. In other embodiments, the treatment fluids may have a pH that is initially at or below a $pK_a$ value for the carboxylic acid groups in the chelating agent, such that the chelating agent is initially inactive for promoting metal ion complexation. In the case of HIDS, the treatment fluid may have a pH below about 2.8 such that this chelating agent is substantially fully protonated.

In various embodiments, systems configured for delivering the treatment fluids described herein to a downhole location are described. In various embodiments, the systems can comprise a pump fluidly coupled to a tubular, the tubular containing a treatment fluid comprising an aqueous carrier fluid, an acid or an acid-generating compound, and a chelating agent comprising hydroxyiminodisuccinic acid or any salt thereof.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present disclosure may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

In various embodiments, the treatment fluids described herein may be used in conjunction with a stimulation operation conducted in a subterranean formation. The treatment fluids may be delivered downhole using the illustrative systems described hereinabove. In some embodiments, the stimulation operation can comprise a fracturing operation. In some or other embodiments, the stimulation operation can comprise an acidizing operation. In some embodiments, the treatment fluids described herein may be used in conjunction with a remediation operation, such as scale dissolution. Each of the foregoing treatment operations and others are discussed in more detail hereinbelow.

In some embodiments, the treatment fluids described herein may be used to treat a proppant pack or a gravel pack in a subterranean formation in order to increase its permeability. In some embodiments, the treatment fluids may be used to treat an existing fracture in a subterranean formation in order to enhance a flow pathway therein. In some embodiments, the treatment fluids may be used in the course of creating or extending a fracture in a subterranean formation by introducing the treatment fluid at or above a fracture gradient of the subterranean formation.

In some embodiments, the treatment fluids may be used to remediate a subterranean formation that has precipitation or accumulation damage therein. As used herein, the term "precipitation or accumulation damage" refers to a material that has been dissolved in a subterranean formation and deposited elsewhere within the subterranean formation, optionally after undergoing a further reaction or encountering conditions leading to decreased solubility (e.g., temperature or pressure conditions). That is, the treatment fluids described herein may be used to dissolve the various components of such damage in order to increase the permeability of the subterranean formation, thereby leading to the possibility of increased production. The precipitation or accumulation damage in the subterranean formation may result from any source, which may include another stimulation operation.

In some embodiments, the treatment fluids described herein may be used when acidizing the matrix of a subterranean formation substantially comprising a carbonate mineral. In such embodiments, the treatment fluids may lead to generation of wormholes in the matrix and enhance production of a hydrocarbon resource from the subterranean formation.

In other various embodiments, the treatment fluids described herein may be used in conjunction with drilling a wellbore penetrating a subterranean formation. For example, when used during drilling, the treatment fluids may desirably leave the subterranean formation conditioned with chelating agent so that precipitation can be subsequently mitigated at a later time. It is to be recognized, however, that the treatment fluids may also be used for proactive treatment of a subterranean formation at points in time other than in the drilling stage, as discussed above.

Embodiments disclosed herein include:

A. Methods for stimulating a subterranean formation using HIDS: The methods comprise: providing a treatment fluid comprising an aqueous carrier fluid and a chelating agent comprising hydroxyiminodisuccinic acid or any salt thereof; introducing the treatment fluid into a subterranean formation comprising a carbonate mineral; and complexing a metal ion in the subterranean formation with the chelating agent.

B. Methods for stimulating a subterranean formation using an alkali metal salt of HIDS. The methods comprise: providing a treatment fluid comprising an aqueous carrier fluid and a chelating agent comprising an alkali metal salt of hydroxyiminodisuccinic acid; introducing the treatment fluid into a subterranean formation comprising a matrix of a carbonate mineral; dissolving at least a portion of the carbonate mineral with an acid to produce a metal ion; and complexing the metal ion with the chelating agent.

C. Treatment fluids comprising HIDS. The treatment fluids comprise: an aqueous carrier fluid; an acid or an acid-generating compound; and a chelating agent comprising hydroxyiminodisuccinic acid or any salt thereof.

D. Systems for introducing a treatment fluid to a subterranean formation. The systems comprise: a pump fluidly coupled to a tubular, the tubular containing a treatment fluid comprising an aqueous carrier fluid, an acid or an acid-generating compound, and a chelating agent comprising hydroxyiminodisuccinic acid or any salt thereof.

Each of embodiments A-D may have one or more of the following additional elements in any combination:

Element 1: wherein the method further comprises dissolving at least a portion of the carbonate mineral with the treatment fluid.

Element 2: wherein the treatment fluid further comprises an acid or an acid-generating compound.

Element 3: wherein the acid reacts with the carbonate mineral to liberate the metal ion therefrom.

Element 4: wherein the treatment fluid has a pH at which the chelating agent is initially inactive for complexing the metal ion, the pH of the treatment fluid rising as the acid reacts and the chelating agent becoming active to complex the metal ion once the pH of the treatment fluid rises above a $pK_a$ value for one or more of the carboxylic acid groups in the chelating agent.

Element 5: wherein the treatment fluid has a pH at which the chelating agent is initially active for complexing the metal ion.

Element 6: wherein the carbonate mineral comprises calcite, dolomite, siderite or any combination thereof.

Element 7: wherein the treatment fluid is substantially free of hydrofluoric acid or a hydrofluoric acid-generating compound.

Element 8: wherein the subterranean formation further comprises a siliceous material.

Element 9: wherein the metal ion is selected from the group consisting of a calcium ion, a magnesium ion, an iron ion, and any combination thereof.

Element 10: wherein the chelating agent further comprises an aminopolycarboxylic acid selected from the group consisting of glutamic acid diacetic acid, methylglycine diacetic acid, β-alanine diacetic acid, ethylenediaminedisuccinic acid, iminodisuccinic acid, N-tris[(1,2-dicarboxyethoxy)ethyl]amine, N-bis[2-(carboxymethoxy)ethyl]glycine, N-bis[2-(1,2-dicarboxyethoxy)ethyl]glycine, N-bis[2-(1,2-dicarboxyethoxy)ethyl]aspartic acid, N-bis[2-(methylcarboxymethoxy)ethyl]glycine, N-bis[2-(1,2-dicarboxyethoxy)ethyl]methylglycine, any salt thereof, any derivative thereof, and any combination thereof.

Element 11: wherein the acid or an acid-generating compound is present in the treatment fluid.

Element 12: wherein the treatment fluid has a pH at which the chelating agent is initially active for complexing a metal ion.

Element 13: wherein the treatment fluid has a pH at which the chelating agent is substantially protonated and is initially inactive for complexing a metal ion.

By way of non-limiting example, exemplary combinations applicable to embodiments A-D include:

Combination 1: The method of A or B in combination with Elements 1 and 2.

Combination 2: The method of A or B in combination with Elements 2 and 7.

Combination 3: The method of A or B in combination with Elements 6 and 7.

Combination 4: The method of A or B in combination with Elements 7 and 8.

Combination 5: The method of A in combination with Elements 2 and 4.

Combination 6: The method of A in combination with Elements 2 and 5.

Combination 7: The treatment fluid of C or the system of D in combination with Elements 7 and 11.

Combination 8: The treatment fluid of C or the system of D in combination with Elements 7 and 12.

To facilitate a better understanding of the present disclosure, the following examples of preferred or representative embodiments are given. In no way should the following examples be read to limit, or to define, the scope of the disclosure.

EXAMPLES

Example 1

Figure 2:
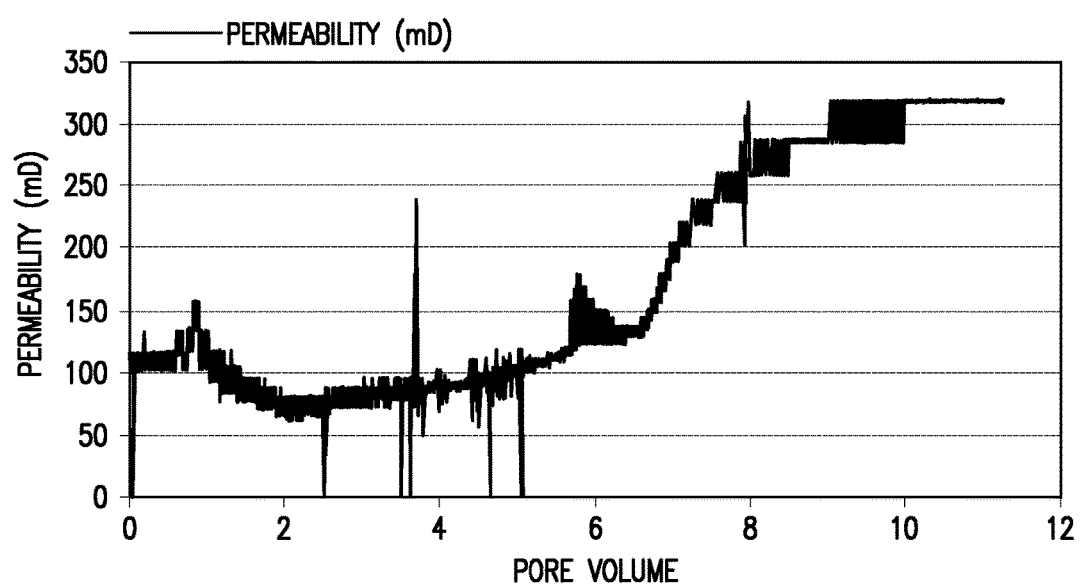
FIG. 2 shows an illustrative plot of effective permeability as a function of pore volume.

A Hassler sleeve with an inside diameter of 1.5 inch was loaded with a 1.5×6 inch Texas Pink limestone core. A pre-flush with 3% aqueous KCl was used to determine the initial permeability of the core. Thereafter, a confining stress of 2500 psi and a backpressure of 1000 psi were established, and a treatment fluid comprising 0.47 M HIDS at pH 4 was flowed through the core at a flow rate of 1 mL/min and at a temperature of 250° F. FIG. 2 shows an illustrative plot of effective permeability as a function of pore volume. As shown in FIG. 2, the treatment fluid was effective to increase the permeability of the core after about 6 pore volumes had been flowed through the core.

Example 2

A second core flow test was conducted with a chalk-type calcite core (Austin cream outcrop) in a similar manner to that described above. In this case, the treatment fluid had an HIDS concentration of 0.47 M and a pH of 2.8. The flow rate through the core was 5 mL/min. The effluent concentrations of calcium and sodium in various fractions are presented in Table 1 below. The pH values of each fraction are also shown. No attempt was made to optimize the number of pore volumes or the flow rate.

TABLE 1

| Sample # | [Ca], ppm | [Na], ppm | pH |
|---|---|---|---|
| 1 | 0.27 | 78,261 | 4.20 |
| 2 | 29.93 | 7.67 | 7.81 |
| 3 | 116.7 | 414.9 | 7.03 |
| 4 | 8464 | 38,239 | 5.81 |
| 5 | 9620 | 61,927 | 5.48 |
| 6 | 10,466 | 69,391 | 5.43 |
| 7 | 7279 | 34,181 | 5.71 |

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
providing a treatment fluid comprising an aqueous carrier fluid, a chelating agent comprising hydroxyiminodisuccinic acid or any salt thereof, and hydrochloric acid;
wherein the treatment fluid is free of both hydrofluoric acid and a hydrofluoric acid generating compound,
introducing the treatment fluid into a subterranean formation comprising a carbonate mineral; and
complexing a metal ion in the subterranean formation with the chelating agent,
wherein the treatment fluid has a pH of about 1 or lower,
wherein the chelating agent is present in an amount effective to decrease a rate of dissolution of the carbonate mineral,
wherein the hydrochloric acid reacts with the carbonate mineral to liberate the metal ion therefrom.

2. The method of claim 1, further comprising:
dissolving at least a portion of the carbonate mineral with the treatment fluid.

3. The method of claim 1, wherein the carbonate mineral comprises cal cite, dolomite, siderite or any combination thereof.

4. The method of claim 1, wherein the subterranean formation further comprises a siliceous mineral.

5. The method of claim 1, wherein the metal ion is selected from the group consisting of a calcium ion, a magnesium ion, an iron ion, and any combination thereof.

6. The method of claim 1, wherein the treatment fluid further comprises an aminopolycarboxylic acid selected from the group consisting of glutamic acid diacetic acid, methylglycine diacetic acid, β-alanine diacetic acid, ethylenediaminedisuccinic acid, N-tris[(1,2-dicarboxyethoxy)ethyl]amine, N-bis[2-(carboxymethoxy)ethyl]glycine, N-bis[2-(1,2-dicarboxyethoxy)ethyl]glycine, N-bis[2-(1,2-dicarboxyethoxy)ethyl]aspartic acid, N-bis[2-(methylcarboxymethoxy)ethyl]glycine, N-bis[2-(1,2-dicarboxyethoxy)ethyl]methylglycine, any salt thereof, and any combination thereof.

7. A method comprising:
providing a treatment fluid comprising an aqueous carrier fluid, chelating agent comprising an alkali metal salt of hydroxyiminodisuccinic acid, and hydrochloric acid;
wherein the treatment fluid is free of both hydrofluoric acid and a hydrofluoric acid generating compound,
wherein the treatment fluid has a pH of about 1 or lower;
introducing the treatment fluid into a subterranean formation comprising a matrix of a carbonate mineral;
dissolving at least a portion of the carbonate mineral with an acid to produce a metal ion; and
complexing the metal ion with the chelating agent,
wherein the chelating agent is present in an amount effective to decrease a rate of dissolution of the carbonate mineral,
wherein the hydrochloric acid reacts with the carbonate mineral to liberate the metal ion therefrom.

8. The method of claim 7, wherein the carbonate mineral comprises calcite, dolomite, siderite, or any combination thereof.

9. The method of claim 7, wherein the metal ion is selected from the group consisting of a calcium ion, a magnesium ion, an iron ion, and any combination thereof.

10. The method of claim 7, wherein the treatment fluid further comprises an aminopolycarboxylic acid selected from the group consisting of glutamic acid diacetic acid, methylglycine diacetic acid, β-alanine diacetic acid, ethylenediaminedisuccinic acid, N-tris[(1,2-dicarboxyethoxy)ethyl]amine, N-bis[2-(carboxymethoxy)ethyl]glycine, N-bis[2-(1,2-dicarboxyethoxy)ethyl]glycine, N-bis[2-(1,2-dicarboxyethoxy)ethyl]aspartic acid, N-bis[2-(methylcarboxymethoxy)ethyl]glycine, N-bis[2-(1,2-dicarboxyethoxy)ethyl]methylglycine, any salt thereof, and any combination thereof.

11. A system comprising:

a pump fluidly coupled to a tubular, the tubular containing a treatment fluid comprising an aqueous carrier fluid, hydrochloric acid or a hydrochloric acid generating compound, and a chelating agent comprising hydroxy-iminodisuccinic acid or any salt thereof;

wherein the treatment fluid is free of both hydrofluoric acid and a hydrofluoric acid generating compound, wherein the treatment fluid has a pH of about 1 or lower, and wherein the tubular extends into a subterranean formation comprising a carbonate mineral, wherein the chelating agent is present in an amount effective to decrease a rate of dissolution of the carbonate mineral, wherein the hydrochloric acid reacts with the carbonate mineral to liberate the metal ion therefrom.

12. The system of claim 11, wherein the treatment fluid further comprises an aminopolycarboxylic acid selected from the group consisting of glutamic acid diacetic acid, methylglycine diacetic acid, β-alanine diacetic acid, ethylenediaminedisuccinic acid, N-tris[(1,2-dicarboxyethoxy)ethyl]amine, N-bis[2-(carboxymethoxy)ethyl]glycine, N-bis[2-(1,2-dicarboxyethoxy)ethyl]glycine, N-bis[2-(1,2-dicarboxyethoxy)ethyl]aspartic acid, N-bis[2-(methylcarboxymethoxy)ethyl]glycine, N-bis[2-(1,2-dicarboxyethoxy)ethyl]methylglycine, any salt thereof, and any combination thereof.

* * * * *